United States Patent
Yang (10) Patent No.: US 12,210,651 B2
(45) Date of Patent: Jan. 28, 2025

(54) METHOD AND SYSTEM FOR REMOVING PERSONALLY IDENTIFIABLE INFORMATION FROM TRANSACTION HISTORIES

(71) Applicant: Drop Technologies Inc., Toronto (CA)

(72) Inventor: I-Sheng Yang, Toronto (CA)

(73) Assignee: DROP TECHNOLOGIES INC., Toronto (CA)

( * ) Notice: Subject to any disclaimer, the term of this patent is extended or adjusted under 35 U.S.C. 154(b) by 480 days.

(21) Appl. No.: 17/527,898

(22) Filed: Nov. 16, 2021

(65) Prior Publication Data

US 2022/0156406 A1 May 19, 2022

Related U.S. Application Data

(60) Provisional application No. 63/114,092, filed on Nov. 16, 2020.

(51) Int. Cl.
*G06F 15/16* (2006.01)
*G06F 21/62* (2013.01)

(52) U.S. Cl.
CPC .............................. *G06F 21/6254* (2013.01)

(58) Field of Classification Search
CPC .................................................. G06F 21/6254
See application file for complete search history.

(56) References Cited

U.S. PATENT DOCUMENTS

| | | | | |
|---|---|---|---|---|
| 10,169,315 | B1* | 1/2019 | Heckel | G06F 21/60 |
| 2016/0085915 | A1* | 3/2016 | Seow | G16Z 99/00 |
| | | | | 705/3 |
| 2018/0198602 | A1* | 7/2018 | Duffy | G06F 40/117 |
| 2018/0219836 | A1* | 8/2018 | Peterson | H04L 67/1097 |
| 2018/0285599 | A1* | 10/2018 | Praveen | G06F 18/22 |
| 2019/0236310 | A1* | 8/2019 | Austin | G16H 10/60 |
| 2019/0319968 | A1* | 10/2019 | Mehta | G06Q 20/0655 |
| 2019/0377903 | A1* | 12/2019 | Fagg | G06Q 50/16 |
| 2022/0394435 | A1* | 12/2022 | Coric | G06N 3/044 |

* cited by examiner

*Primary Examiner* — Oleg Survillo
(74) *Attorney, Agent, or Firm* — Maier & Maier, PLLC (57) ABSTRACT

A method, system, and apparatus for cleansing personally identifiable information from transaction history records. Descriptive text from each transaction entry of the transaction history is converted to tokens and each token is evaluated, on a per-user basis, for repetitiveness and, on a global basis, for uniqueness to compute a metric by which a given token may be indicated as containing personally identifiable information. Ad-hoc rules may further be employed to indicate whether a given token contains personally identifiable information. Tokens indicated as containing personally identifiable information are then masked in a cleansed transaction history output which may be further associated with metadata from the cleansing process.

18 Claims, 6 Drawing Sheets

|   | Descriptive Text | Cleansed Text | Indicator |
|---|---|---|---|
| A | Fee Refund to Richard King | Fee Refund to *** *** | True Positive |
| B | Burger King | Burger King | True Negative |
| C | Fee Refund to Richard King | Fee Refund to Richard King | False Negative |
| D | Burger King | Burger *** | False Positive |
| E | Membership Richard King #RK1983 | Membership Richard *** #RK1983 | Insufficient |
| F | Target Purchase 100900306 | Target Purchase *** | Irrelevant |

```
Perform similarity analysis
of the data
802
          │
          ▼
Collapse each transaction
record in a data set
804
          │
          ▼
Perform a grouping process
on un-collapsed records
806
          │
          ▼
Present records on visual
interface after collapsing
and grouping
808
```

FIG. 8

METHOD AND SYSTEM FOR REMOVING PERSONALLY IDENTIFIABLE INFORMATION FROM TRANSACTION HISTORIES

BACKGROUND

Consumer transaction histories, or transaction records, can be mined and analyzed for trends, statistics, and other metrics to provide a business with a wealth of information related directly or indirectly to consumer spending habits and product preferences. Businesses can leverage these analytics to inform decisions more directly related to sales, including, for example, decisions related to marketing, advertising, product performance in the marketplace, product forecasts, and so forth, thus improving their market position and hopefully increasing overall profits. Likewise, businesses can leverage these analytics to better perform inventory forecasting and supply chain management, allowing replenishment data to be more precisely calculated, ensuring that goods can be shipped at an appropriate timing, and ensuring that any logistical bottlenecks can be avoided to the extent possible.

However, these consumer transaction histories are often rife with Personally Identifiable Information (PII) that can be used to tie a specific person to a specific transaction history or de-anonymize a transaction history. This is often undesirable for a number of reasons, from both a business perspective and a technical perspective.

From a business perspective, numerous jurisdictions have laws related to the holding and handling of PII, such as the European Union's General Data Protection Regulation (GDPR). If a business intends to retain PII, then as a practical measure it often must seek to comply with all of the laws of any possible market that might relate to PII, greatly complicating legal requirements. Likewise, contracting entities or prospective business partners often have their own requirements relating to PII that may complicate the contracting process or business partnership; for example, contracting with the US federal government requires that all contractors with contracts allowing employees to have access to PII must have those employees complete additional privacy training. Further, it may simply be desirable as a matter of policy for the business to be able to say that it does not retain PII in order to better reassure customers that they are not being spied upon.

Likewise, from a technical perspective, retaining this information presents data management issues. PII is a common and highly desirable target for data theft, and retention of PII of any kind greatly increases the security risks faced by the retaining party. While certain types of PII (such as bank account or payment card details) may be particularly valuable to cybercriminals, essentially all PII presents some sort of identity theft risk. For example, security experts have noted that a thief with no more than a name and an address might need no more than this to be able to change a victim's address via the US postal service, redirect mail to an address of their choice, and use this redirection to intercept bank statements, credit card offers and bills, or other financial information, which the thief could then use to order new checks and credit cards in the victim's name. This means that, even if the only PII possessed by the business is processing order information and mailing information for customers, this may have some value to a computer hacker and substantially increase the risk profile of the business. This security risk can only be effectively mitigated by being able to remove unnecessary PII. Further, if the business does not plan to use the PII for any business purpose, then retaining this unnecessary information is likely wasteful as well as presenting a significant security risk; any additional data retained in a database costs storage space and adds to search time, meaning that periodic data curation is often necessary to ensure proper operating efficiency.

As a result, it may be desirable as a matter of security policy or other policy, or required as a matter of law, to cleanse PII from transaction histories before these histories may be used by the originator or sold to third parties for analytical purposes. In order to preserve the value of the transaction history, though, it is also important to reduce any non-PII or collateral information that is removed from or masked in the transaction history during the cleansing process.

Unfortunately, transaction histories do not typically abide by a common formatting standard. Instead, transaction histories take many forms, in some cases unique to the business or other entity, based on the specific needs of the business or entity. There are generally no fixed patterns within this data, as the formats are determined independently by thousands of different entities, including all of the financial entities that facilitate the transactions and the much larger number of entities that are involved in these transactions. (None of these entities have any reason to follow the same rules, particularly not if certain information is important to them but not to another business or vice-versa, and so there is absolutely no ability to acquire any form of standardized data in this context.)

These transaction histories also often are not formatted as natural language, or in a configuration in which they can readily be translated to natural language; usually, transaction history data is automatically machine-generated, and it often is not meant for or suitable for human reading comprehension. (This means that, for example, any system attempting to parse the records must first be able to figure out how to parse them, and as such certain well-developed bodies of work such as modern processes for natural language processing (NLP) cannot be employed directly.) The combination of the non-standard records and the non-standard methods of retaining information in those records compounds the problems associated with automated parsing of this data.

PII also takes many forms, and anything including a person's name, an alphanumeric username, an identification number, a computer-generated alphanumerical code, and the like can be PII. Because of this incredible amount of variation between transaction histories and even transaction entries, there is currently no reliable way to identify or filter all of the PII from a transaction history using conventional methods or standard database tools.

For example, attempting to match record information against a list of common first or last names will fail to identify those instances of PII where a user's name is uncommon or spelled in an unconventional way, or those instances of PII where it has been misspelled due to user error. In other instances, a common name may also coincide with non-PII that one may wish to keep in a cleansed transaction history, since all sorts of businesses make use of common personal names; the need to filter out "Wendy" or "Michael" ideally should not filter out WENDYS RESTAURANT or MICHAELS ARTS AND CRAFTS. Further, computer-generated usernames or user identification codes are impossible to predict and thus impossible to generate suitable filter lists for.

Because of this, there is no reference ground truth for the data which contains the ideal outcome of any sort of PII-cleansing process. The same term may be "identifying"

in some contexts and not in others. (Sometimes, even the exact same information can be identifying in some contexts and not in others; for example, when paired with other information, the same transactional data may be identifying for a first person and not for a second person.)

Thus, a method which can reliably identify occurrences of PII in a transaction history dataset is needed. By cleansing PII that is otherwise difficult to anticipate using conventional methods from transaction history datasets, businesses can retain larger datasets of cleansed transactional data without facing serious security risks. This may in turn allow the cleansed transactional data to be assembled, bought, and sold among parties to leverage the analytical information contained within, providing benefits like better forecasting of product inventory in a manner that can help mitigate supply chain issues.

SUMMARY

A method for cleansing Personally Identifiable Information (PII) from a transaction record, and a system for implementing such a method, are each shown and described. Such a method may generally allow PII to be cleansed in common use contexts, for example in cases where a large number of disparate records are provided from (at minimum) thousands of different sources each using their own standards and often deliberately not following the same rules. This may enable such review and cleansing functionality to be applied outside of cases where all data conforms to the same fixed pattern or small set of fixed patterns, by providing a system that can decide which pieces of evidence are PII without humans specifying any rules for the system and without requiring consistency in the records. This may, in turn, allow for real-time or substantial real-time analysis of the data; for example, it may generally be common for such transactional data to be provided on a day-to-day timescale, meaning that a system that can at least keep pace with incoming transactional data is essential to avoid becoming overwhelmed.

According to an exemplary embodiment, a method may be provided relating to using a machine learning environment to parse a collection of transaction history data. The machine learning environment may utilize both supervised learning and unsupervised learning algorithms to carry out the method. In various exemplary embodiments contemplated herein, the whole of the transaction history data may be parsed by the algorithm, or an incremental or partial portion of the transaction history data may be parsed by the algorithm.

In parsing the transaction history data, the method of the present invention may reduce each transaction history entry into one or more tokens. These tokens may then each be analyzed and evaluated according to a uniqueness metric and/or a repetitiveness metric. If one or both of the uniqueness metric and/or a repetitiveness metric, alone or in combination, exceed a predetermined threshold or a set of predetermined thresholds, then a status of a given token as comprising PII is determined. Optionally, ad-hoc rules may be further employed to determine a status of a given token as comprising PII.

In an exemplary embodiment, those tokens which are identified to comprise PII may be replaced with a generic masking token, and those tokens which are not identified to comprise PII may be left intact. A cleansed and anonymized transaction history is output as a result, based on a combination of the generic masking tokens and the tokens which are left intact.

Methods and algorithms by which the performance of the method may be evaluated are also described herein. Such performance metrics may be used manually to inform or improve the supervised and unsupervised algorithms of the method, or alternatively, these metrics may be incorporated directly into the supervised algorithms to optimize the present invention.

It is further contemplated for various devices and systems—such as computers, servers, databases, Application Specific Integrated Circuits (ASICs), machine-readable data formats, and the like—to be used in order to execute or carry out the methods described herein.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
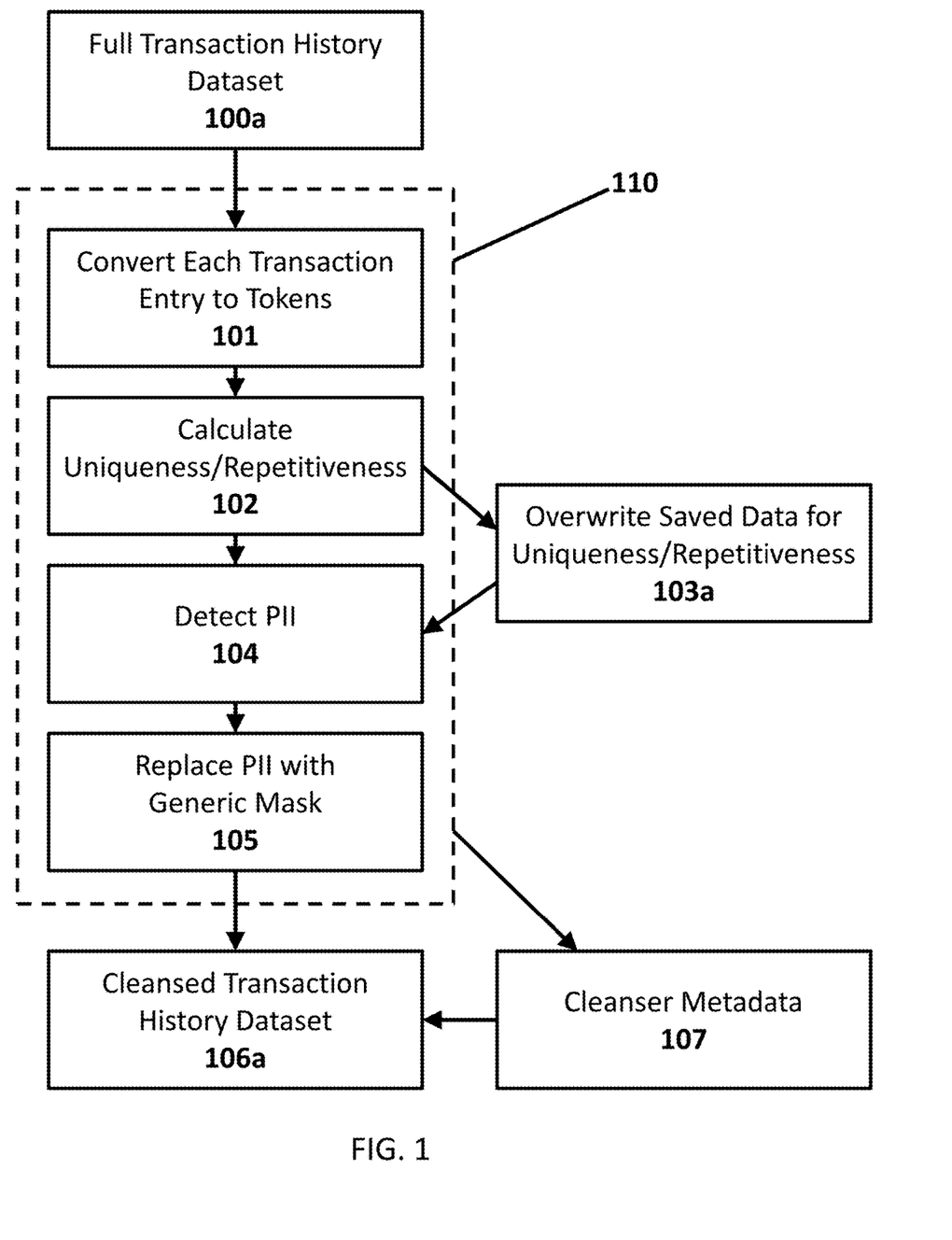
FIG. 1 is an exemplary embodiment of a cleansing process for a full dataset.
Figure 2:
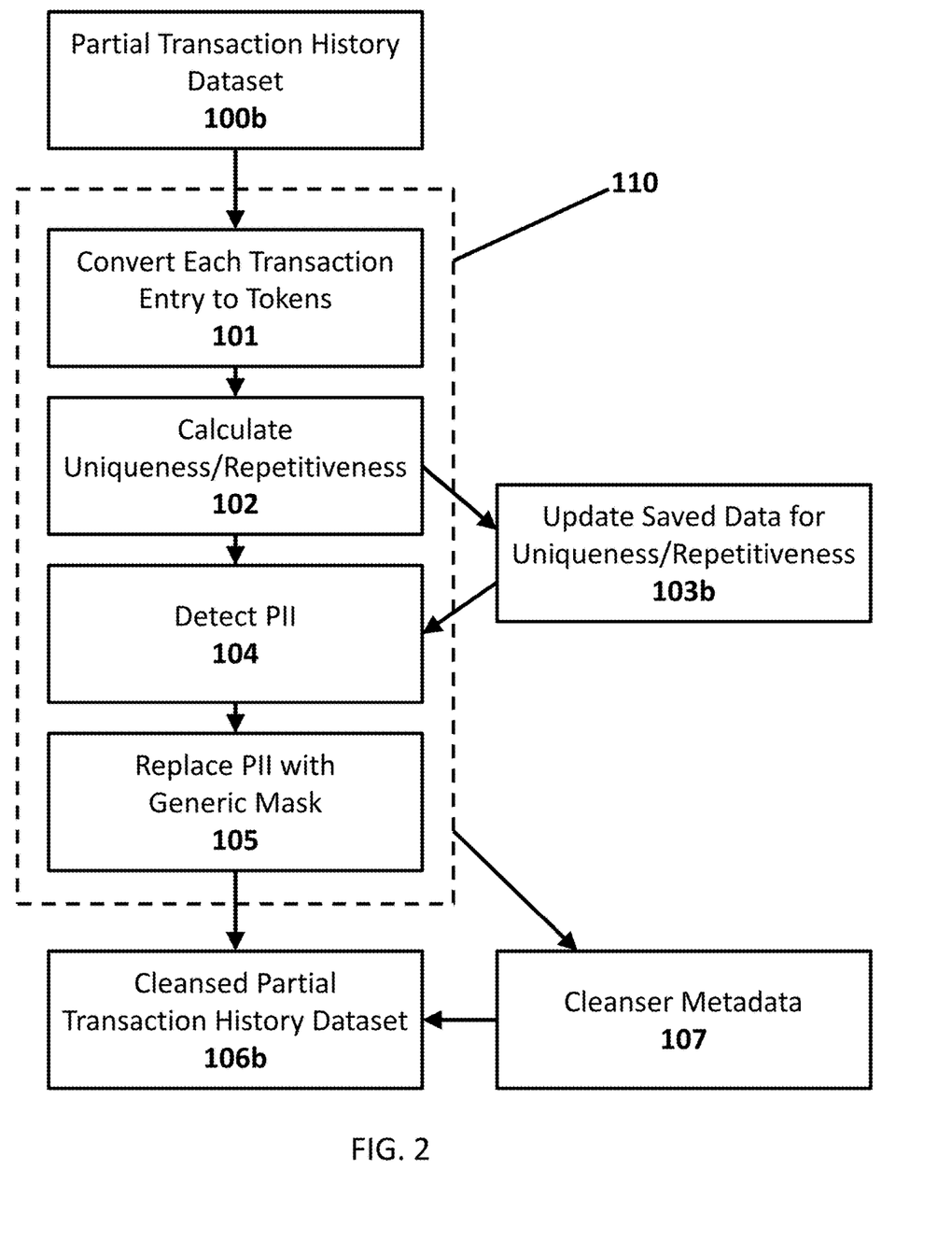
FIG. 2 is an exemplary embodiment of a cleansing process for an incremental dataset.

Turning now to FIGS. 1 and 2, an exemplary method for a process which cleanses PII from a transaction history dataset is shown. In particular, FIG. 1 may show an exemplary embodiment in which a full transaction history dataset 100a is provided and is intended to be cleansed, while FIG. 2 may show an exemplary embodiment in which a partial transaction history 100b is provided and is intended to be cleansed.

In a first step of the exemplary embodiments shown in each of these two figures, a full transaction history dataset 100a or a partial transaction history dataset 100b may be provided. In certain exemplary embodiments, the partial transaction history dataset 100b may be a portion of an otherwise complete transaction history dataset, such as the portion of the otherwise complete transaction history dataset that has not been cleansed before (and a step of providing the partial transaction history dataset 100b may, in some exemplary embodiments, include a step of apportioning this dataset 100b from the otherwise complete transaction history dataset by one or more methods, such as time information associated with the data), or the partial transaction history dataset 100b may be a transaction history dataset which is to be amended to or with another transaction history dataset. In some exemplary embodiments, the partial transaction history dataset 100b may be the only portion of an otherwise complete transaction history dataset or another transaction history dataset which is cleansed, though in other exemplary embodiments the partial transaction history dataset 100b may be cleansed in addition to the otherwise complete transaction history dataset or another transaction history dataset to which it is amended. As generally represented in the embodiment shown in FIG. 2, the partial transaction history dataset 100b is a set of transaction history data which has yet to be cleansed.

In either case, the full transaction history dataset 100a or the partial transaction history dataset 100b may be cleansed by passing the dataset through one or more cleanser algorithms or cleanser algorithm stages, such as cleanser algorithm 110, to obtain a cleansed transaction history dataset 106a or a cleansed partial transaction history dataset 106b. These cleansed datasets 106 thus contain transaction histories which no longer contain PII and may then be used or combined with other transaction history datasets for analytical purposes.

In a first step 101, the cleanser algorithm 110 may receive the transaction history dataset and converts each transaction history entry into token form by converting each entry into one or more tokens which each embody some of the information provided in the respective transaction history entry. In certain exemplary embodiments, each such substep may be executed in sequence, such that the cleanser algorithm operates on the full transaction history dataset 100a or the partial transaction history dataset 100b upon receipt of the entire dataset it is to be operated on, while in other exemplary embodiments steps or substeps may be executed in parallel, for example such that the system begins analyzing the full or partial transaction history dataset 100a, 100b elements as soon as a certain number of them are provided or as soon as a certain percentage of the dataset is provided, or according to any other such logic as may be desired.

In an exemplary embodiment, a transaction history entry may be defined as a line item in the transaction history, and as such a search operation may proceed line-by-line. In a given dataset, such as a dataset with a typical set of transaction records, a line item of a transaction history commonly contains information such as, but not limited to, a transaction date, transaction description, and/or transaction amount. In an exemplary set of records, it may be determined or surmised that the transaction description is where PII is most commonly found, and thus in such exemplary embodiments the cleanser algorithm 110 may focus on the transaction description. However, in other exemplary embodiments, such as instances where each single line item of a transaction history contains additional data fields which may contain PII, or in which a common data field such as the transaction date is formatted in such a way that the data field comprises PII, the cleansing algorithm 110 may parse those data fields in addition to, or instead of, the transaction description.

Thus, descriptive text from each line item of the transaction history which might contain PII may be converted in this manner to token form. In various exemplary embodiments, the text may be broken down word by word, or phrase by phrase, or at any other division, into tokens which are indexed and evaluated by the cleanser algorithm 110. In an exemplary embodiment, words or phrases may be delineated, for example, by common punctuation such as spaces, periods, hyphens, and the like; for example, in an exemplary embodiment, a given string in the transaction history may have each individual data field separated by commas, and tokens may be formed from separating the strings in the transaction histories at the commas.

Alternatively, in another exemplary embodiment, words or phrases may be delineated through contextual analysis of the descriptive text. For example, in a string containing no spaces or punctuation, a dictionary list may be utilized to identify common words or phrases contained in the contiguous character string. As another example, a shift from numeric characters only to an alphanumeric string may also be used to identify potential words or phrases. In this manner, a character string with no punctuation may yet be broken up into distinct words or phrases which may then be converted into tokens.

Once a given transaction history entry is reduced to a token form, these tokens may be parsed in a second step 102 to determine a uniqueness metric and/or a repetitiveness metric. To accomplish this, each token is associated with the person, or user, to which the token corresponds in a token-user pair.

As may generally be understood, PII may be information that, when used alone or with other relevant data, may be useful for identifying an individual. It is possible for certain elements to be common to large numbers of people but still useful in aggregate to identify a specific person; for example, millions of people may have the same race, hair color, eye color, data of birth, and state of residence, but the combination of each of these aspects may be shared by a much smaller number of people. The uniqueness metric, then, may be a measure of how often certain token(s) and/or token arrangements appear or repeat across numerous users, whether within the given dataset or within a broader population. In other words, the uniqueness metric determines how likely it is that a token can be used to identify a specific person.

The repetitiveness metric measures how frequently certain token(s) and/or token arrangements appear or repeat for the particular user. In various exemplary use contexts, it may be more likely for a user's PII to be collected by many similar entities, which may be interested in substantially the same PII (e.g. the user's name or mailing address). However, in those same use contexts, it may be more likely for tokens appearing only once or a very small number of times for a particular user to correspond to information provided by a transacting business rather than being personal to the user; for example, a business might provide a unique order number for a customer's order that is, by its nature, unique and used only once (with the only opportunity for reuse coming from a second business using the same scheme). Thus, if a token only occurs once for a user, the algorithm may conclude that it is unlikely that the token describes PII relating to the user.

Different formats of the same token, such as a token with varying arrangements of upper and lower case letters, may be consolidated when evaluated for uniqueness and/or repetitiveness. (For example, a Mr. McDonald may have this last name rendered, in various systems, as MCDONALD or Mcdonald, and these may be consolidated.) Likewise, multiple accounts may be consolidated if they all belong to one person or user. In this manner, or using other common methods known to a person skilled in the art, the information in the transaction history dataset 100 can be primed or optimized in a simple manner or during a pre-conditioning step to improve the determination of the uniqueness and/or repetitiveness metrics.

In a third step 103, information relating to the determined uniqueness and/or repetitiveness data may be saved outside of the cleanser algorithm 110. This saved information may be used in follow-up cleansing operations, ongoing cleansing operations, continued cleansing operations, and/or analysis of the cleanser algorithm's performance. By saving the identified metrics between iterations of the cleanser algorithm 110, for instance, it is possible to identify improvements in the cleanser algorithm 110 in response to changes in the cleanser algorithm 110 itself or rulesets used by the cleanser algorithm. Likewise, the saved information may be used in order to reevaluate previous determinations, for example if an identifier only appears to have a lower repetitiveness value because the user did not engage in many transactions in a given period generally, or did not engage in many transactions which use the data. (For example, if customer loyalty card information is publicly available and functions as PII, the user may have transactions with the same store that do and do not use their customer loyalty card number; for example, the user may have lost their card or may have forgotten it at home during some transactions. If the user loses the card, shops numerous times at the store, and then finds it again, a last data period may only have a small number of instances of use of the card but the saved information may have a much higher number.)

In those instances where a full transaction history dataset 100a is utilized, the uniqueness and/or repetitiveness data saved 103a outside of the cleanser algorithm 110 may be overwritten so that previous iterations do not interfere with a current cleansing operation. However, it may also be advantageous in some embodiments to preserve this older uniqueness and/or repetitiveness data so that a current cleansing operation may be enhanced or sped up, or the previous data used to build a more robust uniqueness and/or repetitiveness dataset.

In those instances where a partial transaction history dataset 100b is utilized, the uniqueness and/or repetitiveness data may be used to update and/or amend previously obtained uniqueness and/or repetitiveness data. However, as with full datasets, it may also be advantageous in some embodiments to overwrite or reset the uniqueness and/or repetitiveness data in between each incremental cleansing operation.

In a fourth step 104, the cleanser algorithm may identify which tokens describe PII. To do so, the cleanser algorithm may evaluate the uniqueness and/or the repetitiveness information determined in the second step 102 and/or the uniqueness and/or the repetitiveness information from the third step 103, either alone or in any combination, to evaluate whether or not one or more, or a set of, predetermined thresholds threshold are met. (For example, in an exemplary embodiment, it may be contemplated for the system to use repetitiveness information determined in the second step and repetitiveness information determined in the third step separately, with the system comparing each to one or more predetermined thresholds. This may, for example, filter out cases like the one discussed above where the user's information is not repetitive in the most recent dataset but is repetitive in the overall dataset, and may likewise filter out cases where the user's information is repetitive in the most recent dataset but is not repetitive in the overall dataset, such as instances where the user has just moved and changed their address, or instances where the user has gotten married and changed their name.)

When utilizing an unsupervised machine learning environment, the cleanser algorithm 110 may make use of, but is not limited to, cluster analysis to identify which tokens and/or token arrangements are likely to be PII based on their uniqueness and/or repetitiveness metrics. Accordingly, the cleanser algorithm can establish uniqueness and/or repetitiveness thresholds to identify which tokens and/or token arrangements are likely to be PII or anonymous transaction data. In this manner, the cleanser algorithm 110 may automatically establish the appropriate predetermined thresholds for uniqueness and/or repetitiveness. Alternatively, these thresholds may be manually set before the cleanser algorithm 110 is executed.

In another possible embodiment, vectorization techniques may be employed to obtain additional information for each token and/or token arrangement. This additional information may be then combined with the determined uniqueness and/or repetitiveness metrics to further refine a determination as to whether a certain token represents PII.

In a supervised machine learning environment, the cleanser algorithm 110 may compare a cleansed transaction dataset against a training transaction dataset, scoring the result, to refine either or both of the uniqueness and/or repetitiveness metrics and the predetermined uniqueness and/or repetitiveness thresholds in order to best match the training transaction dataset. In some embodiments, the scoring weights ascribed to correctly identifying PII and the scoring weights ascribed to correctly identifying generic transaction information, such as brand keywords, may be the same. In other preferable embodiments, the scoring weights may be different between these types of information. Likewise, it may be contemplated to apply different scoring weights to different forms of PII or different generic transaction information, such as based on a priority with which the information is to be removed.

For example, in one exemplary embodiment, it may be absolutely essential to eliminate all personal name information, and as such a very high scoring weight may be placed on all forms of personal name information associated with a given user, such as the user's full name, the user's maiden name, family name information such as the user's mother's maiden name, or any aliases or nicknames associated with the user. The same very high scoring weight may likewise be applied to personal identification number information, such as the user's social security number, financial account number or credit card number, or any similar information (that may be less likely to be used in a given transaction) such as patient identification number, driver's license number, or vehicle identification number. A lower scoring weight may be applied to more widely held characteristics such as data of birth or age information (which may, for example, be present for transactions related to age-restricted items), and the lowest scoring weight may be applied to geographic information such as the user's country of residence. Such a system may be provided with a higher "false positive" rate for essential information (being, for example, somewhat more likely to remove "McDonald's" from a string if it can ensure that "John McDonald" is always removed) and a lower "false positive" or higher "false negative" rate for less essential information (being, for example, somewhat less likely to leave in that a user's transaction came from "7-11" if it is less essential to redact that the user's age is "71").

Figure 3:
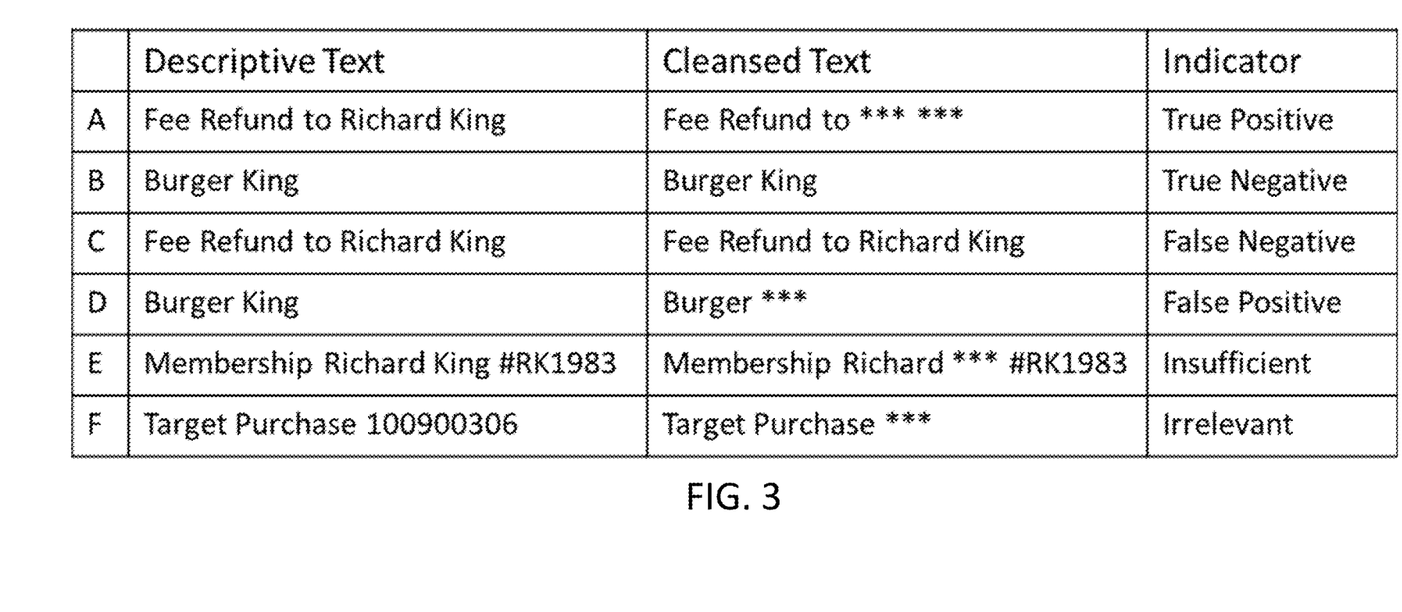
FIG. 3 is an exemplary set of cleanser outputs and corresponding evaluation flags.

Once PII is identified in a given token, the token describing PII may be replaced by a masking token in a fifth step 105. In some embodiments, this masking token may be a generic phrase or series of characters which indicates PII was cleansed from that portion of the descriptive text. (For example, in one exemplary embodiment, a set of three asterisks, "***," may be used in order to designate that PII had been present in a replaced token; this embodiment is shown in FIG. 3.) In other embodiments, the masking token may simply delete the token from the descriptive text altogether.

The tokens masked by the cleanser algorithm 110 in the fifth step may be those identified through the fourth step 104; however, the tokens masked may also be masked according to any additional sets of rules, which may for example include manually defined rules or rules applied by a further machine learning algorithm or stage, which may for example be run subsequently.

For instance, the additional set of rules may comprise a list or set of common first and/or last names, against which the tokens may be evaluated according to common methods and practices. (This may, for example, provide a better guarantee that PII that is essential to remove is actually removed.) Alternatively, the additional set of rules may comprise a set of compound rules, such as where a token matches an entry of the list of common first and/or last names and either (1) relates positionally in a predetermined fashion to another token which also matches an entry of the list of common first and/or last names, (2) the descriptive text also describes keywords or tokens related to banking transactions, or (3) the transaction line item contains another token identified as PII. However, this is not an exhaustive list of additional rules which may be applied in the fifth step 105. Other, conventional rules known to those skilled in the art may also be employed at this stage to complement those PII determinations made in the fourth step 104.

Once all tokens identified as describing PII have been masked, the cleansed transactional history dataset 106 is then output.

As noted previously, various processing strategies may be applied in various exemplary embodiments. For example, during a cleansing operation, the cleanser algorithm 110 may process the transaction history dataset 100 in a bulk fashion and may utilize parallel computing architectures to do so. The cleanser algorithm may conduct a first step 101 for all entries of the dataset, and then conduct a second step 102 for all entries of the dataset, and so on through the fifth step 105. By running the cleanser algorithm 110 in this manner, one can ensure that the most complete sets of uniqueness and/or repetitiveness information is being used to cleanse each entry of the transaction history dataset 100.

During an incremental or partial cleansing operation, the transaction history dataset 100 may also be processed in a bulk fashion using parallel computing architecture. However, in these incremental or partial cleansing operations, these bulk operations are conducted only on the partial transaction history datasets 100b. (It may, for example, be contemplated to split the data into parts and independently perform the operations on each of the parts.) By incorporating saved data for uniqueness and/or repetitiveness 103b from a previous cleansing operation, accurate evaluations of uniqueness and/or repetitiveness may still be obtained for the partial transaction history dataset 103b. The saved data for uniqueness and/or repetitiveness 103b may also be updated with new uniqueness and/or repetitiveness data from the current cleansing operation for use in future cleansing operations.

It may also be contemplated to process the transaction history dataset 100a or 100b multiple times so that, as the uniqueness and/or repetitiveness metrics are improved through the execution of the cleanser algorithm 110, one may achieve a higher confidence that all PII is cleansed from the transaction history dataset 100. For example, it may not be readily determinable, for recent data in the dataset, whether the new data is actually repetitive or not without analysis of the dataset as a whole to identify whether there are any repetitions. As such, the dataset 100a or 100b may be processed in order to identify all instances in which a possibly-repetitive term is used, and may then be reprocessed in order to replace this term if it is identified as being sufficiently repetitive and associated with a particular individual to qualify as probable PII.

In an exemplary embodiment, then, each process shown in FIGS. 1 and 2 may be run a minimum of twice, and in some exemplary embodiments more than twice. In these exemplary embodiments, this may allow the system to determine uniqueness and repetition for each of the millions or billions of transaction records that may be under analysis, then once uniqueness and repetition have been determined in the first pass, proceed through the process a second time in order to remove information flagged as PII. In such embodiments, in which millions or billions of transaction records are being read, it may be particularly advantageous to externally store data pertaining to uniqueness/repetitiveness in a manner that allows for this information to be incrementally updated and referenced.

Optionally, in a seventh step 107, metadata describing the cleanser algorithm 110, such as inputs provided to the algorithm, parameters regarding the execution of the algorithm, runtime information, versioning information, error logs, scoring or analytical metrics, and the like, may be associated with the cleansed transaction history dataset 106.

Turning now to FIG. 3, a chart illustrating a sample transaction history dataset featuring examples A-F is shown. A potential PII indication of the tokens is shown, and the desirability of this masking indicated in the chart.

For instance, the tokens "Richard" and "King" of example A both describe PII, especially when featured together, and therefore the system may identify that it is preferable that both the tokens "Richard" and "King" be masked to eliminate all PII from the transaction line item.

However, in example B, the token "King" when featured with "Burger" does not describe PII, but rather a brand name. Therefore, in example B, it is preferable that none of the tokens be masked. Example B further highlights how conventional filtering means, such as using common name lists and the like alone, can result in too much information being cleansed from a transaction history, such as in Example D. By leveraging the uniqueness and/or repetitiveness metrics of the present invention, the arrangement "Burger King" would result in a uniqueness score below the predetermined thresholds so that "Burger King" is protected from unnecessary removal.

Examples C and E both highlight instances in which tokens are insufficiently masked. In Example E, not only would the token "Richard" need to be masked, but so would the token "#RK1983" and/or "RK1983," as this user ID is also PII. The user ID of Example E also highlights the difficulty a conventional dictionary or word list filtering system may have in anticipating PII that is wholly unique and unpredictable. The token "RK1983" is very likely to be unique in the dataset and is very likely to only repeat in the dataset when also accompanied by the tokens "Membership Richard King," and therefore this combination of uniqueness and repetitiveness may sufficiently identify the "RK1983" token as PII.

Example F illustrates a neutral outcome. Here, the token "100900306" represents a purchase order number, or a store number, and would likely be identified similarly to the token "RK1983" of Example E. However, because the purchase order number or store number isn't necessary to identify the brand name of "Target," whether or not the number is removed is irrelevant to the value of the resulting cleansed dataset and so its removal receives indifferent treatment.

Still, if the token "100900306" of Example F represents a store number, whether or not this store number is sufficient to constitute PII will depend on factors which may be realized through the present invention. For example, if this store is rarely visited by others, or rarely appears in the transaction histories of others, but the store is frequented often by a particular user (or is frequented by the user at a particular timing, or is frequented often by many users but only a few of a certain race or hair color or other demographic information, or other such information), then the frequency of visits by the particular user, in combination with geographical information about the store, may be sufficient to render the store number as PII for the particular user. Thus, this frequency from the particular user may be discerned through the repetitiveness metric, which may be determined to exceed one or more predetermined thresholds, and as a result the store number would be properly flagged as PII and masked for the particular user while being left intact for others for whom the store number does not constitute PII.

Alternatively, in other exemplary embodiments, it may be contemplated to remove the store number from all users, or all store numbers from all users, based on the ease with which the store number can be used to identify a particular user in a particular case. It is noted that, in some contexts, the determination that what is innocuous information for one user could be identifying information for another user may itself assist in identifying the second user, since even though the information has been removed it may be significant that it has been removed. (For example, it can be readily seen that famous logic puzzles often use the fact that information is known or unknown to some party or is significant to some party as an essential part of a solution; in one common example, two logicians may be told that integers have been chosen such that $1<x<y$ and $x+y<100$, with one logician given the value $x+y$ and the other given the value $xy$. The chain of reasoning that allows the values of the information to be determined is the first logician offering "I cannot determine the two numbers" and the second offering "I knew that;" this allows each, successively, to then determine them.)

Figure 4:
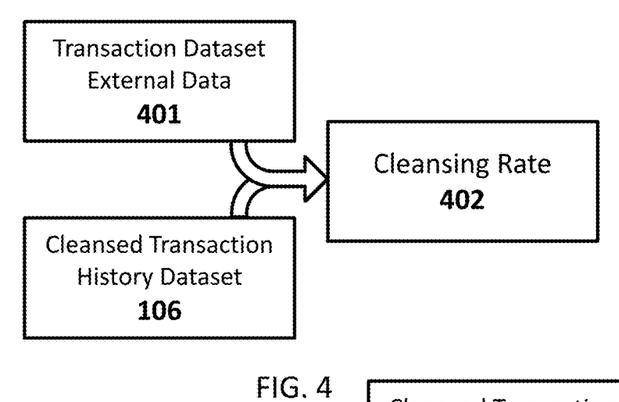
FIG. 4 is an exemplary embodiment of a method for evaluating the performance of the cleansing method.
Figure 5:
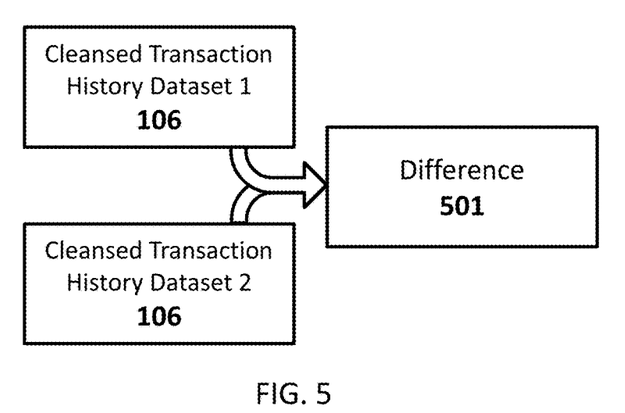
FIG. 5 is an exemplary embodiment of a method for evaluating the performance of the cleansing method.
Figure 6:
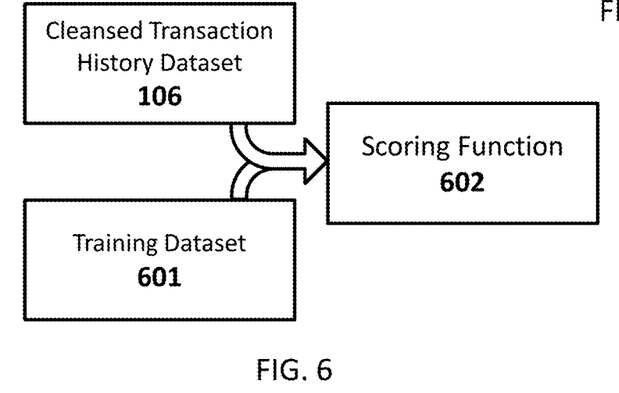
FIG. 6 is an exemplary embodiment of a method for evaluating the performance of the cleansing method.

Turning now to FIGS. 4-6, various embodiments of the present invention for evaluating the effectiveness of the cleanser algorithm 110 are shown.

FIG. 4 illustrates an embodiment in which a cleansed transaction history dataset 106 is evaluated against external data concerning which transactions were cleansed and transaction dataset external data 401 describing, for example, the brands associated with each transaction line item and the category of each transaction line item as can be determined.

In doing so, known relationships between how frequently a given brand and/or category requires PII to be masked, the cleansing rate 402, can serve as an advance indicator of any anomalies arising from the determination of PII in a given transaction history dataset. This advance indicator may be monitored manually, or the advance indicator may alternatively be employed in either the supervised or unsupervised machine learning environments along with predetermined thresholds to signal an error and/or halt the cleansing process.

FIG. 5 illustrates an embodiment in which iterative sets of cleansed transaction history datasets 106 are compared against one another to highlight tokens which received different cleansing treatment in each dataset between iterations. These comparisons, or differences 501, may be manually or automatically evaluated, and may be utilized in the building and refinement of training data sets for supervised machine learning environments. By reducing the iterative datasets into these focused comparisons, manual checking of the cleanser algorithm 110 may also be conducted much more quickly and easily. (For example, in an exemplary embodiment, the use of this system may allow any differences associated with an arbitrarily small change to the cleanser or its operating methodology to be highlighted prominently for the user, allowing for iterative tweaking of its operating methodology as well as more substantive changes.)

FIG. 6 illustrates another embodiment relating to a training dataset used in supervised machine learning environments. Here, a cleansed transaction history dataset 106 is compared against a labeled dataset or a training dataset 601 and evaluated according to a scoring function 602. Preferably, the scoring of the cleansed dataset is determined preferably according to primary scoring categories—the retention of brand keywords, the removal of PII tokens, and the indifferent treatment towards superfluous or other information. The specific scoring values or functions assigned these categories and any corresponding subcategories may vary. Alternatively, other scoring methods may be used and additional or fewer primary categories may also be employed.

Figure 7:
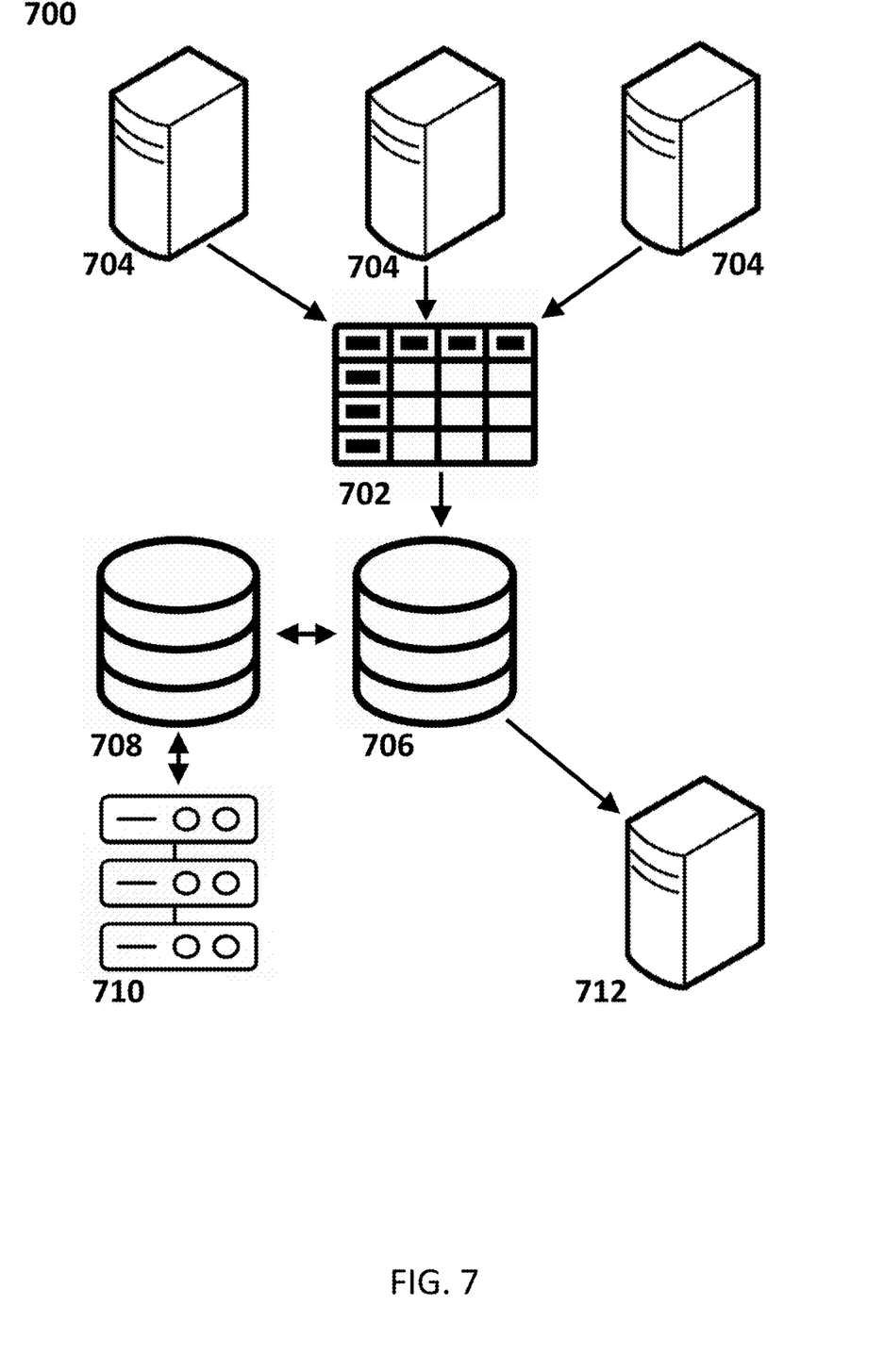
FIG. 7 is an exemplary embodiment of an integration of the system into an automated data pipeline.

FIG. 7 illustrates an exemplary integration of the system into an automated data pipeline 700. In an exemplary embodiment, a plurality of transaction records 702 may be retrieved from one or more external servers 704, and a full transaction history dataset 100a may be provided in a database 706. Following this, a selection of the available data, such as a partial transaction history dataset 100b, may be separately retrieved and stored, for example in a second database 708, for review. Data operations may then be executed on the partial transaction history dataset 100b, as described for example in FIGS. 1 and 2, based on one or more systems 710 (which may be, for example, general-purpose computers including a processor and a memory) configured to run the cleanser algorithm 110. Once the partial transaction history dataset 100b has been cleansed, the database 706 may be updated. In various exemplary embodiments, data may be retrieved from the one or more external servers 704 according to a preset schedule, which may trigger the further processing; likewise, it may be desirable to provide the amended data to one or more other external servers 712 in one or more forms upon completion of the cleansing process.

For example, in an exemplary embodiment, it may be contemplated to provide output data in the form of an automatically updated table for persisted cleaner output upon completion of the cleansing process. Likewise, it may be contemplated to transform the cleansed data according to one or more standards and to then combine the cleansed data with other elements of a data licensing product.

Figure 8:
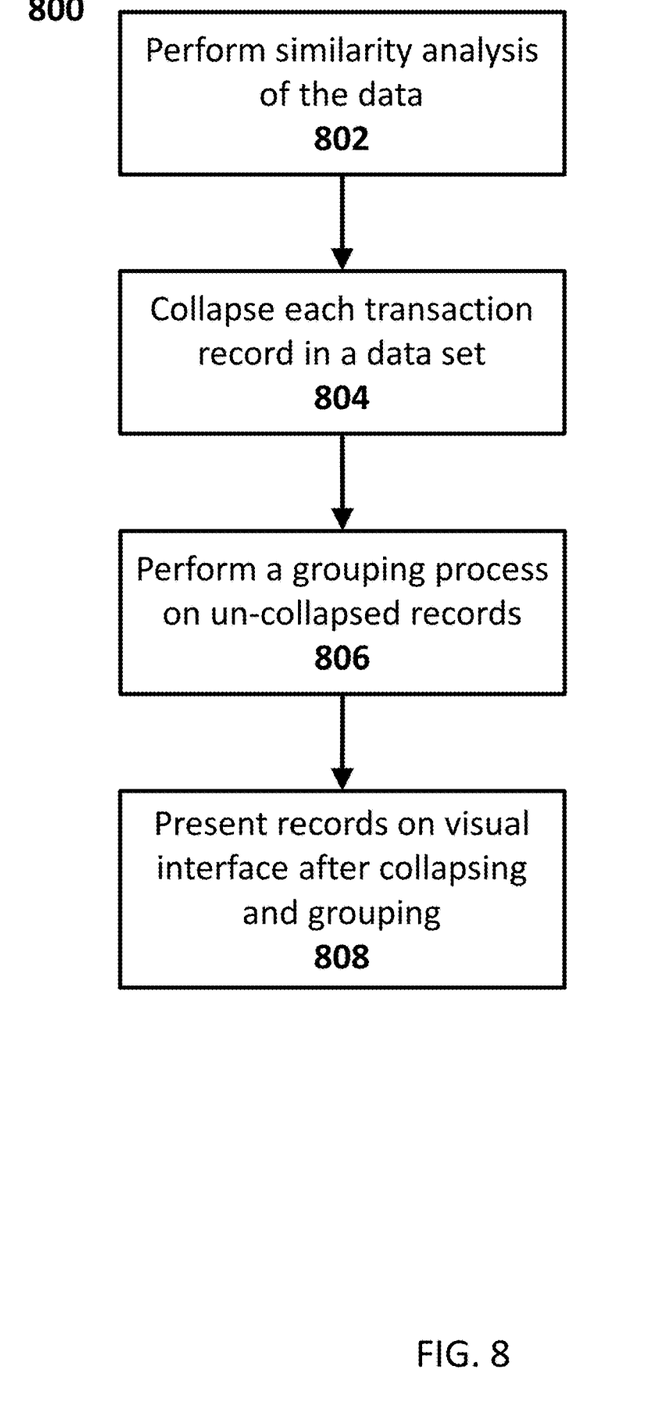
FIG. 8 is an exemplary embodiment of a review and benchmarking process which may be provided following a cleansing step.

FIG. 8 illustrates an exemplary review process 800 for performing benchmarking of an overall process provided in the data pipeline. In a first step, it may be contemplated to perform a similarity analysis of the data 802, such that data values having at least a predetermined similarity value to one another can be identified. In an exemplary embodiment, the similarity of a pairing of transactions may be determined based on whether the transactions have the same length (for example, the same number of tokens, the same number of characters, or any other such metric), whether the transactions have identical keywords (which may be PII keywords or other keywords, or a combination of each, such as may be desired), whether the transactions have keywords in the same positions, or any other such similarity elements. For example, in an exemplary embodiment, a first transaction that has the same length as a second transaction based on the first and second transaction having the same number of tokens, and has two identical keywords in identical positions to the second transaction, may be determined to have been generated by the same pattern as the second transaction.

Once this similarity analysis has been performed, it may be contemplated to collapse each transaction record in a set of transaction records provided in a data set 804, based on the results of the similarity analysis. For example, it may be desired to only keep one element of a set of transactions that have been determined to be "very similar," and so, as such, once the similarity analysis has been performed, the other transactions in the set of "very similar" transactions may be collapsed into this first record in order to better facilitate manual benchmarking. This may ensure that a discrete type of record can be particularly identified, and can better ensure that reviewing efforts can be effectively directed at unique elements.

Once a collapsing process has been performed, it may be desired to group together elements which are considered to have a high similarity score but one below the first predetermined threshold, in a grouping process 806. For example, in an exemplary embodiment, transaction similarity scores that do not meet the first threshold identifying them as "very similar" may be analyzed to determine transaction similarity scores that meet a second threshold identifying them as "similar." This may, for example, allow transaction standards that are minor variants of one another or which appear to contain generally similar information to be identified via a subsequent review process; this might include, for example, a manual review process, which might benefit from placing similar records in closer proximity, or a more computationally taxing comparison algorithm, which might likewise benefit from having apparently similar records grouped by a first algorithm in order to reduce search costs for the second, more computationally expensive algorithm.

For example, in an exemplary embodiment, results from the grouping process 806 may be provided on a visual interface for manual inspection 808. In an exemplary embodiment, a manual reviewer may be assigned 1000 transaction records to review, based on a first transaction record and the 999 most similar transaction records that do not meet the threshold for grouping with the first transaction record as being of the same format. (In some exemplary embodiments, one or more particular features, such as length, may be assigned a greater weight in some similarity processes, such as the determination of which records are "similar" but not 'very similar;" this might, for example, ensure that a human reviewer can review a table of tokens that is of the same visual length in order to prevent behaviors like having to scroll back and forth or keep the tokens at a lower level of magnification.) Based on such a process, then, it may be possible for reviewing of 10,000 records by the more resource-intensive option (such as the human review process) to be equivalent to checking one million or even ten million records, providing a significant savings in time and efficiency.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for isolating and removing personal identifying information (PII) from a plurality of uncleansed data records, comprising:
   receiving and storing, in a database, at least one electronic communication containing the plurality of uncleansed data records, said database comprising a plurality of cleansed data records;
   retrieving, from the database, a selection of data records including at least the plurality of uncleansed data records;
   for each data record in the selection of data records, performing a cleansing process comprising:
      separating, in a separation step, said data record into a plurality of data record tokens, each token uniquely associated with a data string in the data record;
      for each token in the plurality of data record tokens, the plurality of data record tokens comprising at least two tokens including a first token and a second token, comparing the token to a stored plurality of tokens, determining at least one PII probability metric for the token, and evaluating the at least one probability metric against a predetermined threshold, wherein said at least one probability metric comprises at least one of a uniqueness metric and a repetitiveness metric, wherein the uniqueness metric comprises a measure of how often one or more tokens appear in data associated with a plurality of users and wherein the repetitiveness metric comprises a measure of how often the one or more tokens appear in data associated with a user associated with the PII;

determining, for the first token, that the first token exceeds the predetermined threshold, and, based on such determination, replacing the first token and the data string uniquely associated with the first token with generic mask data; and determining, for the second token, that the second token does not exceed the predetermined threshold, and, based on such determination, leaving the second token and the data string uniquely associated with the second token unaltered;

upon determination that all data records in the selection of data records have been cleansed by the cleansing process, outputting, as an electronic communication, a combined set of data records comprising at least the selection of data records and the plurality of cleansed data records in the database.

2. The method of claim 1, wherein the data string is at least one of a word or a phrase.

3. The method of claim 1, wherein the at least one probability metric comprises at least a uniqueness metric; wherein the cleaning process further comprises:

after the separation step, storing, in an aggregate plurality of tokens associated with the selection of data records, at least a first plurality of data record tokens associated with a first data record in the selection of data records and a second plurality of data record tokens, wherein the aggregate plurality of tokens is associated with at least two users; and determining the uniqueness metric for the token by comparing the token to the aggregate plurality of tokens, determining an overall number of matches to the token or to an arrangement of tokens including the token in the aggregate plurality of tokens, and generating the uniqueness metric based on at least a determination of whether the overall number of matches to the token is lower or higher than a threshold.

4. The method of claim 3, wherein the selection of data records further includes the plurality of cleansed data records stored in the database, said plurality of cleansed data records associated with a time period earlier than a time period associated with the plurality of uncleansed data records, and wherein comparing the token to the aggregate plurality of tokens comprises matching the token against historical usage information.

5. The method of claim 3, further comprising storing, in the database, prior to the step of receiving and storing the at least one electronic communication, uniqueness data associated with the plurality of cleansed data records; and after determining the uniqueness metric for the token, overwriting the uniqueness data with the uniqueness metric for the token.

6. The method of claim 1, wherein the at least one probability metric comprises at least a repetitiveness metric; wherein the cleaning process further comprises:

after the separation step, storing, in an aggregate plurality of tokens associated with the selection of data records, at least a first plurality of data record tokens associated with a first data record in the selection of data records and a second plurality of data record tokens, wherein each of the aggregate plurality of tokens is associated with only one user; and determining the repetitiveness metric for the token by comparing the token to the aggregate plurality of tokens, determining a number of matches to the token in the aggregate plurality of tokens, and generating the repetitiveness metric based on at least a determination of whether the overall number of matches to the token is lower or higher than a threshold.

7. The method of claim 6, wherein the selection of data records further includes the plurality of cleansed data records stored in the database, said plurality of cleansed data records associated with a time period earlier than a time period associated with the plurality of uncleansed data records, and wherein comparing the token to the aggregate plurality of tokens comprises matching the token against historical usage information.

8. The method of claim 7, further comprising storing, in the database, prior to the step of receiving and storing the at least one electronic communication, repetitiveness data associated with the plurality of cleansed data records; and after determining the uniqueness metric for the token, overwriting the repetitiveness data with the repetitiveness metric for the token.

9. The method of claim 1, wherein outputting, as the electronic communication, the combined set of data records comprises:

evaluating each combined data record in the combined set of data records for similarity by comparing each combined data record to a plurality of other data records in the combined set of data records, determining a matching score for the combined data record and saving the matching score in a plurality of matching scores, and comparing the matching score to a first threshold and a second threshold;

outputting the combined set of data records to a user interface, wherein outputting the combined set of data records to the user interface comprises:

for each combined data record in the combined set of data records whereby the matching score associated with the combined data record exceeds the first threshold, selecting only one collapsed data record in a matching set of combined data records that includes the combined data record, and displaying the collapsed data record;

for each second combined data record in the combined set of data records whereby the matching score associated with the second combined data record does not exceed the first threshold and exceeds the second threshold, displaying the second combined data record in a group; and making at least one adjustment to the combined set of data records from the user interface prior to output of the combined set of data records as the electronic communication.

10. A system for isolating and removing personal identifying information (PII) from a plurality of uncleansed data records, the system comprising a processor, a memory, at least one database, and a network connection, wherein the system is configured to perform steps of:

receiving and storing, in the database, at least one electronic communication containing the plurality of uncleansed data records, said database comprising a plurality of cleansed data records;

retrieving, from the database, a selection of data records including at least the plurality of uncleansed data records;

for each data record in the selection of data records, performing a cleansing process comprising:

separating, in a separation step, said data record into a plurality of data record tokens, each token uniquely associated with a data string in the data record;

for each token in the plurality of data record tokens, the plurality of data record tokens comprising at least two tokens including a first token and a second token, comparing the token to a stored plurality of tokens, determining at least one PII probability metric for the token, and evaluating the at least one probability metric against a predetermined threshold, wherein said at least one probability metric comprises at least one of a uniqueness metric and a repetitiveness metric, wherein the uniqueness metric comprises a measure of how often one or more tokens appear in data associated with a plurality of users and wherein the repetitiveness metric comprises a measure of how often the one or more tokens appear in data associated with a user associated with the PII;

determining, for the first token, that the first token exceeds the predetermined threshold, and, based on such determination, replacing the first token and the data string uniquely associated with the first token with generic mask data; and determining, for the second token, that the second token does not exceed the predetermined threshold, and, based on such determination, leaving the second token and the data string uniquely associated with the second token unaltered;

upon determination that all data records in the selection of data records have been cleansed by the cleansing process, outputting, as an electronic communication, a combined set of data records comprising at least the selection of data records and the plurality of cleansed data records in the database.

11. The system of claim 10, wherein the data string is at least one of a word or a phrase.

12. The system of claim 10, wherein the at least one probability metric comprises at least a uniqueness metric; wherein the cleaning process further comprises:

after the separation step, storing, in an aggregate plurality of tokens associated with the selection of data records, at least a first plurality of data record tokens associated with a first data record in the selection of data records and a second plurality of data record tokens, wherein the aggregate plurality of tokens is associated with at least two users; and determining the uniqueness metric for the token by comparing the token to the aggregate plurality of tokens, determining an overall number of matches to the token or to an arrangement of tokens including the token in the aggregate plurality of tokens, and generating the uniqueness metric based on at least a determination of whether the overall number of matches to the token is lower or higher than a threshold.

13. The system of claim 12, wherein the selection of data records further includes the plurality of cleansed data records stored in the database, said plurality of cleansed data records associated with a time period earlier than a time period associated with the plurality of uncleansed data records, and wherein comparing the token to the aggregate plurality of tokens comprises matching the token against historical usage information.

14. The system of claim 12, further comprising storing, in the database, prior to the step of receiving and storing the at least one electronic communication, uniqueness data associated with the plurality of cleansed data records; and after determining the uniqueness metric for the token, overwriting the uniqueness data with the uniqueness metric for the token.

15. The system of claim 10, wherein the at least one probability metric comprises at least a repetitiveness metric; wherein the cleaning process further comprises:

after the separation step, storing, in an aggregate plurality of tokens associated with the selection of data records, at least a first plurality of data record tokens associated with a first data record in the selection of data records and a second plurality of data record tokens, wherein each of the aggregate plurality of tokens is associated with only one user; and determining the repetitiveness metric for the token by comparing the token to the aggregate plurality of tokens, determining a number of matches to the token in the aggregate plurality of tokens, and generating the repetitiveness metric based on at least a determination of whether the overall number of matches to the token is lower or higher than a threshold.

16. The system of claim 15, wherein the selection of data records further includes the plurality of cleansed data records stored in the database, said plurality of cleansed data records associated with a time period earlier than a time period associated with the plurality of uncleansed data records, and wherein comparing the token to the aggregate plurality of tokens comprises matching the token against historical usage information.

17. The system of claim 16, further comprising storing, in the database, prior to the step of receiving and storing the at least one electronic communication, repetitiveness data associated with the plurality of cleansed data records; and after determining the uniqueness metric for the token, overwriting the repetitiveness data with the repetitiveness metric for the token.

18. A non-transitory computer-readable medium comprising program code for isolating and removing personal identifying information (PII) from a plurality of uncleansed data records that, when executed, causes a system comprising a processor and a memory to perform steps of:

receiving and storing, in a database, at least one electronic communication containing the plurality of uncleansed data records, said database comprising a plurality of cleansed data records;

retrieving, from the database, a selection of data records including at least the plurality of uncleansed data records;

for each data record in the selection of data records, performing a cleansing process comprising:

separating, in a separation step, said data record into a plurality of data record tokens, each token uniquely associated with a data string in the data record;

for each token in the plurality of data record tokens, the plurality of data record tokens comprising at least two tokens including a first token and a second token, comparing the token to a stored plurality of tokens, determining at least one PII probability metric for the token, and evaluating the at least one probability metric against a predetermined threshold, wherein said at least one probability metric comprises at least one of a uniqueness metric and a repetitiveness metric, wherein the uniqueness metric comprises a measure of how often one or more tokens appear in data associated with a plurality of users and wherein the repetitiveness metric comprises a measure of how often the one or more tokens appear in data associated with a user associated with the PII;

determining, for the first token, that the first token exceeds the predetermined threshold, and, based on such determination, replacing the first token and the data string uniquely associated with the first token with generic mask data; and determining, for the second token, that the second token does not exceed the predetermined threshold, and, based on such determination, leaving the second token and the data string uniquely associated with the second token unaltered;

upon determination that all data records in the selection of data records have been cleansed by the cleansing process, outputting, as an electronic communication, a combined set of data records comprising at least the selection of data records and the plurality of cleansed data records in the database.

* * * * *